United States Patent
Loesch et al.

(10) Patent No.: US 10,823,819 B2
(45) Date of Patent: Nov. 3, 2020

(54) RADAR SYSTEM INCLUDING AN ANTENNA ARRAY FOR TRANSMITTING AND RECEIVING ELECTROMAGNETIC RADIATION

(71) Applicant: Robert Bosch GmbH, Stuttgart (DE)

(72) Inventors: Benedikt Loesch, Stuttgart (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 16/080,504

(22) PCT Filed: Dec. 29, 2016

(86) PCT No.: PCT/EP2016/082808
§ 371 (c)(1),
(2) Date: Aug. 28, 2018

(87) PCT Pub. No.: WO2017/148561
PCT Pub. Date: Sep. 8, 2017

(65) Prior Publication Data
US 2019/0011532 A1    Jan. 10, 2019

(30) Foreign Application Priority Data

Feb. 29, 2016  (DE) .......................... 10 2016 203 160

(51) Int. Cl.
*G01S 7/03* (2006.01)
*G01S 13/42* (2006.01)
(Continued)

(52) U.S. Cl.
CPC .............. *G01S 7/032* (2013.01); *G01S 13/42* (2013.01); *G01S 13/931* (2013.01); *H01Q 1/3233* (2013.01); *H01Q 21/065* (2013.01)

(58) Field of Classification Search
None
See application file for complete search history.

(56) References Cited

U.S. PATENT DOCUMENTS 4,766,435 A  *  8/1988  Wells .................... G01S 7/026
                                                342/159
6,246,365 B1 *  6/2001  Tokoro .................. G01S 13/42
                                                342/149
(Continued)

FOREIGN PATENT DOCUMENTS

DE   102009032114 A1   1/2010
DE   102014201026 A1   7/2015
(Continued)

OTHER PUBLICATIONS

International Search Report dated Mar. 27, 2017 of the corresponding International Application PCT/EP2016/082808 filed Dec. 29, 2016.

*Primary Examiner* — Bernarr E Gregory
(74) *Attorney, Agent, or Firm* — Norton Rose Fulbright US LLP; Gerard Messina

(57) ABSTRACT

A radar system includes an antenna array for sending and receiving electromagnetic radiation, the array including N transmitting antennas and M receiving antennas, objects being detectable within the detection area of the antennas according to the MIMO principle using the antennas. The transmitting antennas transmit signals that are orthogonal to one another during a transmission cycle. N-n of the transmitting antennas are situated horizontally next to one another and n of the transmitting antennas are situated in a horizontally offset manner at an identical offset from respective ones of the N-n transmitting antennas. M-m of the receiving antennas are situated horizontally next to one another and m of the receiving antennas are situated vertically offset from the M-m receiving antennas.

12 Claims, 3 Drawing Sheets

(51) Int. Cl.
  *G01S 13/931* (2020.01)
  *H01Q 1/32* (2006.01)
  *H01Q 21/06* (2006.01)
  *G01S 13/00* (2006.01)

(56) References Cited

U.S. PATENT DOCUMENTS

| | | | | | |
|---|---|---|---|---|---|
| 6,750,810 | B2* | 6/2004 | Shinoda | ............... | G01S 13/4463 342/149 |
| 6,771,206 | B2* | 8/2004 | Berthelier | ............... | G01S 7/024 342/22 |
| 7,355,546 | B2* | 4/2008 | Randall | ................. | G01S 13/426 342/26 R |
| 7,436,348 | B2* | 10/2008 | Nohmi | ...................... | G01S 7/35 342/25 R |
| 8,289,203 | B2* | 10/2012 | Culkin | ................ | H01Q 21/061 342/117 |
| 8,717,224 | B2* | 5/2014 | Jeong | ................... | G01S 13/931 342/70 |
| 9,568,600 | B2* | 2/2017 | Alland | ................ | G01S 13/931 |
| 10,168,419 | B2* | 1/2019 | Trummer | ............. | H01Q 1/3233 |
| 10,481,249 | B2* | 11/2019 | Alenljung | ............. | G01S 13/931 |
| 2011/0074620 | A1* | 3/2011 | Wintermantel | ....... | G01S 13/931 342/70 |
| 2011/0221625 | A1* | 9/2011 | Cornic | ................ | G01S 13/4463 342/29 |
| 2013/0027269 | A1* | 1/2013 | Orime | ..................... | G01S 7/032 343/841 |
| 2014/0055297 | A1* | 2/2014 | Beeri | .................... | G01S 13/003 342/21 |
| 2014/0104097 | A1* | 4/2014 | Binzer | ................. | G01S 13/931 342/74 |
| 2014/0306840 | A1* | 10/2014 | Koerber | ................ | G01S 13/931 342/107 |
| 2015/0204972 | A1 | 7/2015 | Kuehnle et al. | | |
| 2015/0253419 | A1 | 9/2015 | Alland | | |
| 2015/0260836 | A1* | 9/2015 | Hayakawa | ........... | G01S 13/931 342/70 |
| 2016/0033632 | A1* | 2/2016 | Searcy | ................. | G01S 13/931 342/153 |
| 2016/0131742 | A1* | 5/2016 | Schoor | ................ | G01S 13/931 342/128 |

FOREIGN PATENT DOCUMENTS

| | | |
|---|---|---|
| EP | 2963442 A1 | 1/2016 |
| JP | H05218736 A | 8/1993 |
| JP | 2003248055 A | 9/2003 |
| JP | 2014062779 A | 4/2014 |

\* cited by examiner

RADAR SYSTEM INCLUDING AN ANTENNA ARRAY FOR TRANSMITTING AND RECEIVING ELECTROMAGNETIC RADIATION

CROSS-REFERENCE TO RELATED APPLICATIONS

The present application is the national stage of International Pat. App. No. PCT/EP2016/082808 filed Dec. 29, 2016, and claims priority under 35 U.S.C. § 119 to DE 10 2016 203 160.0, filed in the Federal Republic of Germany on Feb. 29, 2016, the content of each of which are incorporated herein by reference in their entireties.

FIELD OF THE INVENTION

The present invention relates to a radar system including an antenna array for sending and receiving electromagnetic radiation for object detection according to the MIMO principle.

BACKGROUND

In the automotive industry, adaptive cruise controls, which allow for a cruise control in the sense of a distance control and make driving in a convoy of cars more comfortable, have been increasingly used in recent years. Here, radar sensors are used in most cases which include antenna arrays for detecting preceding objects and other surroundings objects.

An adaptive cruise control of this type is, for example, known in the publication "Adaptive Fahrgeschwindigkeitsregelung ACC," published in April 2002 by Robert Bosch GmbH, Stuttgart, Germany, having the ISBN number ISBN-3-7782-2034-9.

An antenna array is known from DE 10 2009 032 114 A1, for example, where a radar system for detecting the surroundings of a motor vehicle, including means for detecting reflection points, which can be driven over or under, is illustrated and which includes patch antennas for transmitting and receiving electromagnetic radiation.

SUMMARY

According to example embodiments of the present invention, a radar system includes an antenna array for sending and receiving electromagnetic radiation, N first antennas being provided for transmitting and M second antennas being provided for receiving and objects being detected within the detection area of the antennas according to the MIMO principle using the N first transmitting antennas and the M second receiving antennas. The N first transmitting antennas transmit transmitted signals, which are orthogonal to one another, during a transmission cycle; N-n of the N first transmitting antennas are situated horizontally next to one another; n of the N first transmitting antennas are situated in a vertically offset manner at an identical offset in each case in relation to the N-n transmitting antennas which are situated horizontally next to one another; M-m of the M second receiving antennas are situated horizontally next to one another; and m of the M second receiving antennas are situated in a vertically offset manner in relation to the M-m receiving antennas which are situated horizontally next to one another.

A principle of the present invention is to provide a radar system including an antenna array which makes it possible to achieve, together with MIMO time division multiplexing, a good azimuth estimation as well as, across the relevant angle range, an unambiguous elevation angle estimation having a large aperture, i.e., a high degree of accuracy and a high degree of separability. At the same time, structures are made possible with the aid of the array of antennas according to the present invention so that the high-frequency chip which contains the transceiver components and can be designed as an MIMIC (monolithic microwave integrated circuit), can be placed centrally within the sensor, thus resulting in short and approximately equally long feed lines to the antennas. This is advantageous with regard to attenuation losses and phase synchronization between the individual high-frequency channels.

It can be advantageously provided that the n transmitting antennas, which are situated in an offset manner in relation to the N-n transmitting antennas situated horizontally next to one another, is exactly one transmitting antenna. In the case of this implementation, in which n=1, all other transmitting antennas are situated horizontally next to one another with only one antenna being vertically shifted. This allows for a precise ascertainment of the azimuth which is of particular importance for a distance control in motor vehicles. While the ascertainment of an elevation angle is made possible, the azimuth is ascertained more precisely than the elevation angle during the measurement of this azimuth, since the latter is of greater importance for driving tasks of an adaptive cruise control system.

It is furthermore advantageous that the m receiving antennas, which are situated in an offset manner in relation to the M-m receiving antennas situated horizontally next to one another, is exactly one receiving antenna. In this advantageous embodiment in which m=1, the receiving antennas are situated horizontally next to one another, thus allowing for a precise ascertainment of the azimuth of the detected objects as well as for an elevation angle estimation of the received signals at the same time. In this case, while the ascertainment of an elevation angle is also made possible, the measurement of the azimuth is more precise than the measurement of the elevation angle, since the former is of greater importance for driving tasks of an adaptive cruise control system.

It is furthermore advantageous that the m receiving antennas, which are situated in an offset manner in relation to the M-m receiving antennas situated horizontally next to one another, each has a different vertical offset in relation to the M-m receiving antennas situated horizontally next to one another. As a result of the different vertical offsets of the individual antennas, it is possible to carry out measurements having different apertures and different resolution capacities of the received signals. In the case of an identical unambiguity range, the implementable aperture having different vertical offsets is in addition greater than when equal vertical offsets are used (uniform linear array).

It is furthermore advantageous that the N transmitting antennas and/or the M receiving antennas are designed as patch antennas. Patch antennas are rectangular antenna fields which can be etched out of the copper layer of a circuit board. This makes it possible to form complicated antenna arrays by structuring and etching away a copper layer, without the manufacturing process requiring more effort when the complexity of the structures increases. Patch antennas of this type are manufacturable particularly cost-effectively and easily.

It is furthermore advantageous that all M receiving antennas include the same number and the same array of patches.

As a result of this feature, the entire antenna array is made up of multiple identical patch antennas.

It is furthermore advantageous that the transmitted signals, which are orthogonal to one another, are implemented using time division multiplexing, code division multiplexing, or frequency division multiplexing. For transmitting orthogonal transmitted signals, signals that do not interfere with one another are to be generated, which makes the listed methods of time division multiplexing, code division multiplexing, or frequency division multiplexing, particularly suitable.

It is furthermore advantageous that a monolithic microwave integrated circuit (MIMIC) is situated centrally between the N transmitting antennas and M receiving antennas. It is thus made possible that the feed lines from the monolithic microwave integrated circuit to the antenna ports can be designed to have approximately the same length, whereby approximately the same phase relations result between the individual transmitted signals or between the individual received signals and the feed lines can be kept preferably short at the same time, so that attenuation of the transmitted signals can be minimized at the same time.

It is furthermore advantageous that the monolithic microwave integrated circuit (MMIC) includes signal processing devices for transmitting channels as well as signal processing devices for receiving channels. It is thus made possible to manufacture a particularly small antenna which can in addition be manufactured cost-effectively, since a better part of the circuit parts of the radar system is co-integrated into the monolithic microwave integrated circuit and, outside of this IC, only the antenna structures must be provided on a circuit board.

Other features, possible applications, and advantages of the present invention are derived from the following description of exemplary embodiments of the present invention, which are illustrated in the figures of the drawings. All features described or illustrated represent the present invention alone or in any arbitrary combination, regardless of their recapitulation in the patent claims or their back-reference, and regardless of their wording in the description or illustration in the drawings.

Exemplary embodiments of the present invention are elucidated in the following based on the drawings.

DETAILED DESCRIPTION

Figure 1:
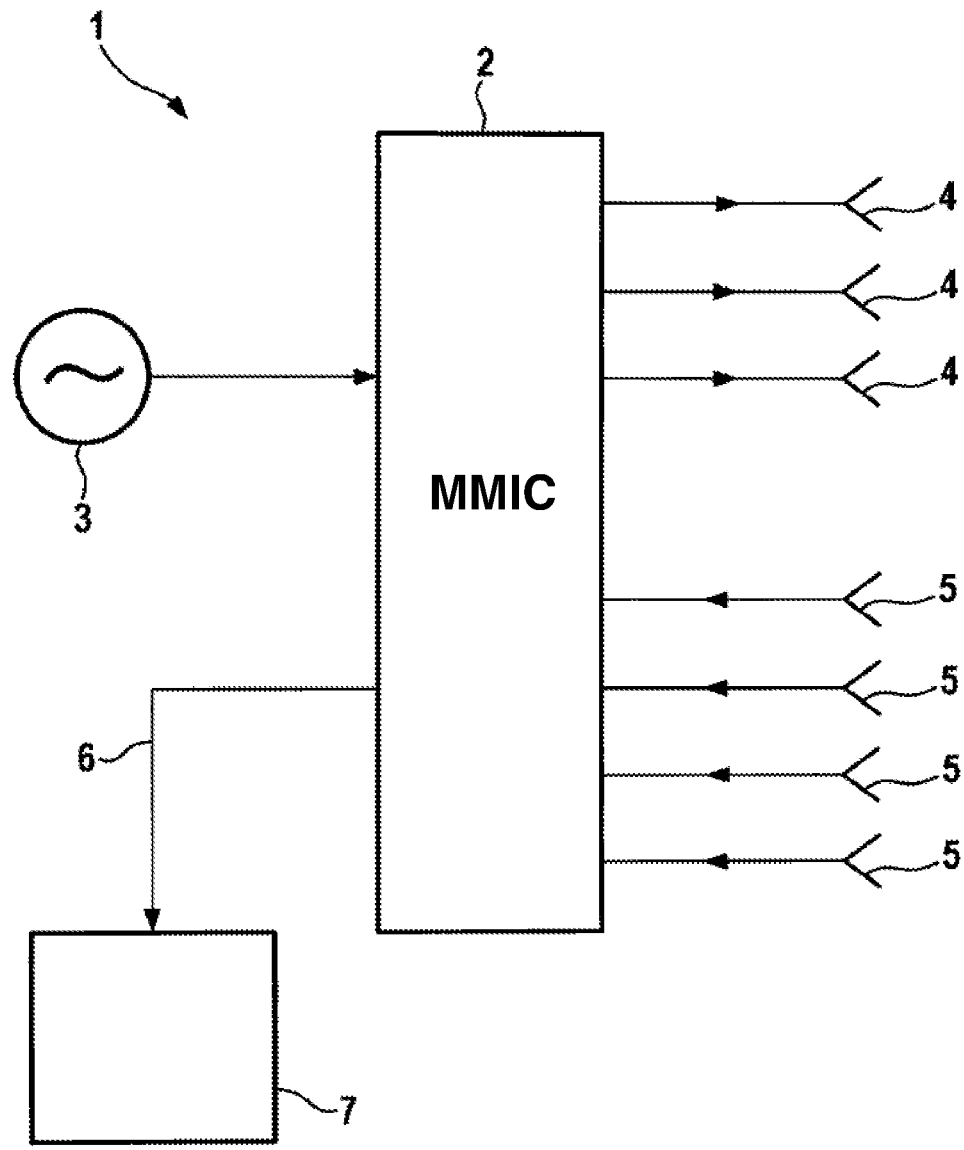
FIG. 1 is a schematic block diagram of a radar system according to an example embodiment of the present invention.

In FIG. 1 shows a radar system transceiver device 1 that includes a monolithic microwave integrated circuit (MMIC) 2, which is an integrated circuit including high-frequency circuit components that process the signals in the microwave range or millimeter wave range. Components of this type can, for example, involve frequency splitters, frequency multipliers, mixers, amplifiers, or other transmitting and receiving components. The output signal of an oscillator 3 is fed to this monolithic microwave integrated circuit 2 as an input signal. This oscillator 3 generates a frequency relayed as an output signal to the circuit elements connected downstream and thus brings about the generation of a carrier frequency of a microwave signal. Furthermore, a series of transmitting antennas (Tx) 4, to which monolithic microwave integrated circuit 2 outputs transmitted signals that are emitted by transmitting antennas (Tx) 4, is connected to monolithic microwave integrated circuit 2.

Furthermore, a series of receiving antennas (Rx) 5, which receive microwave signals from the surroundings and feed them to circuit 2, is connected to monolithic microwave integrated circuit 2. The signals received by receiving antennas (Rx) 5 are preferably signals which were previously emitted by transmitting antennas (Tx) 4 and partially reflected on the objects to be detected, and converted back into electrical signals by receiving antennas (Rx) 5. The numbers of transmitting antennas (Tx) 4 and receiving antennas (Rx) 5 do not have to be identical. It is conceivable, for example, that a radar system 1 according to the present invention includes a larger number of transmitting antennas 4 or a smaller number of transmitting antennas 4 than the number of provided receiving antennas 5. The received signals that are fed to monolithic microwave integrated circuit 2 by receiving antennas 5 are processed in the MIMIC, and the output signals are fed to an evaluating circuit 7 via MMIC output 6. It is conceivable, for example, that mixers, demodulators, as well as analog/digital converters are co-integrated on MIMIC 2 so that the received signals are mixed down, demodulated, and digitally converted by receiving antennas 5 on MMIC 2, and digitized object data are relayed to evaluating circuit 7 via MIMIC output 6. It is, however, also possible that only some of the listed components are co-integrated on monolithic integrated circuit 2 and thus already digitized data cannot be output at MIMIC output 6. In this case, it is also possible to accommodate the analog/digital converter in evaluating circuit 7 and to transfer an intermediate frequency signal from MIMIC 2 via MMIC output 6. In evaluating circuit 7, the signal reflections are evaluated with regard to their distance, their azimuth, their elevation angle, as well as potentially also with regard to their signal strength and fed to a further object processing unit.

In the case of an adaptive distance control, the evaluation of the azimuth of each of the particular detected objects is of great importance, since it can be used to ascertain whether or not the preceding vehicle is in one's own travel corridor.

Figure 2:
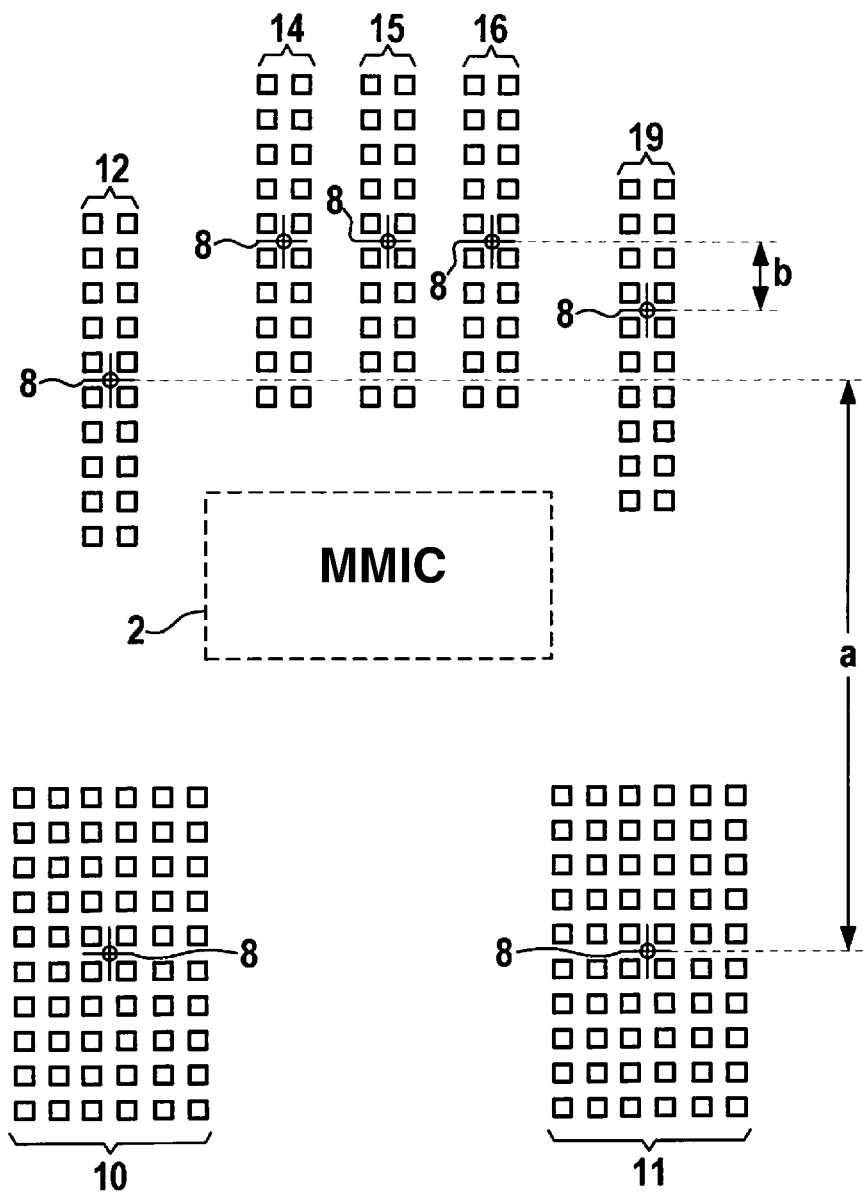
FIG. 2 illustrates an antenna array according to an example embodiment of the present invention.

In FIG. 2, a possible array of transmitting antennas (Tx) 4 as well as of receiving antennas (Rx) 5 is illustrated, by use of which the azimuth as well as the elevation angle of the preceding and detected objects can be ascertained particularly advantageously. For example, patch antennas 10, 11 illustrated in the lower half of the image, as well as patch antennas 12 illustrated in the top left corner are transmitting antennas (Tx) 4 which are provided for transmitting. Patch antennas 14, 15, 16 as well as 19 are each formed through 2-gap patch antennas and are each illustrated in the top half of the image. In this case, the array is made up of N=3 transmitting antennas as well as n=1, i.e., exactly one vertically offset transmitting antenna 12. In the illustrated example, receiving antennas (Rx) 5 are made up of M=4 patch antennas and m=1, i.e., exactly one vertically offset receiving antenna, as is depicted by receiving antenna array 19. In the center between illustrated antenna arrays 10 through 19, a possible location for positioning monolithic microwave integrated circuit (MIMIC) 2 is illustrated with the aid of a dashed line. It can be situated on the back side of the high-frequency circuit board or on the front side of the high-frequency circuit board on which antenna arrays 10 through 19 are applied. According to the present invention, the front side of the high-frequency circuit board is understood to mean the side of the circuit board on which the transmitting and receiving antennas are situated. This embodiment has the advantage that vias through the circuit board are dispensed with. Positioning the MMIC(s) on the back side of the high-frequency circuit board yields an advantages that there is greater latitude with regard to the positioning of the MMIC, the MMIC has short connecting lines to the other signal processing components, and the MIMIC can be better protected, by an internal metal layer in the circuit board between the front and the back sides of the high-frequency circuit board, against interference radiation of incident electromagnetic signals. In the case of this type of positioning of monolithic microwave integrated circuit 2, approximately equally long feed lines between the patch antennas and the MIMIC are obtained, which yields advantages with regard to the phase position of the transmitted and received signals and becomes noticeable in a minor attenuation of the transmitted and received signals.

In particular antenna patches 10 through 19, particular phase centers 8 are furthermore plotted which result for the sum of the signals which are received or emitted by the particular antenna patches. The horizontal array of transmitting antennas Tx or the horizontal array of receiving antennas Rx makes it possible to detect the azimuth of the objects to be detected. In this case, it is not possible, however, to also ascertain the elevation angle of reflection centers by using only horizontally situated antennas, so that transmitting antenna 12 is vertically offset in relation to the two other transmitting antennas 10 and 11 according to the present invention and one, multiple or, optionally, all transmitting antennas can simultaneously emit a transmitted signal. The vertical offset of transmitting antenna 12 in relation to antennas 10, 11 situated horizontally next to one another is in this case offset 'a' in the vertical direction in the specific embodiment illustrated in FIG. 2. Likewise, receiving antennas 14 through 16 can be situated horizontally next to one another with regard to their phase centers 8 in order to facilitate a good determination of the azimuth of the objects to be detected. Additional receiving antenna 19 is, in this case, offset by offset 'b' vertically to receiving antennas (Rx) 14 through 16 situated horizontally next to one another, thus facilitating an ascertainment of the elevation angle of the objects to be detected.

Since the MIMO principle is also used in the elevation direction, four measurements can be used. By offsetting transmitting antennas Tx by a and by offsetting receiving antennas Rx by b, four virtual positions 0; a; b; a+b result, so that a quality value can be determined in each case for a 1-target as well as for a 2-target elevation estimation.

Figure 3:
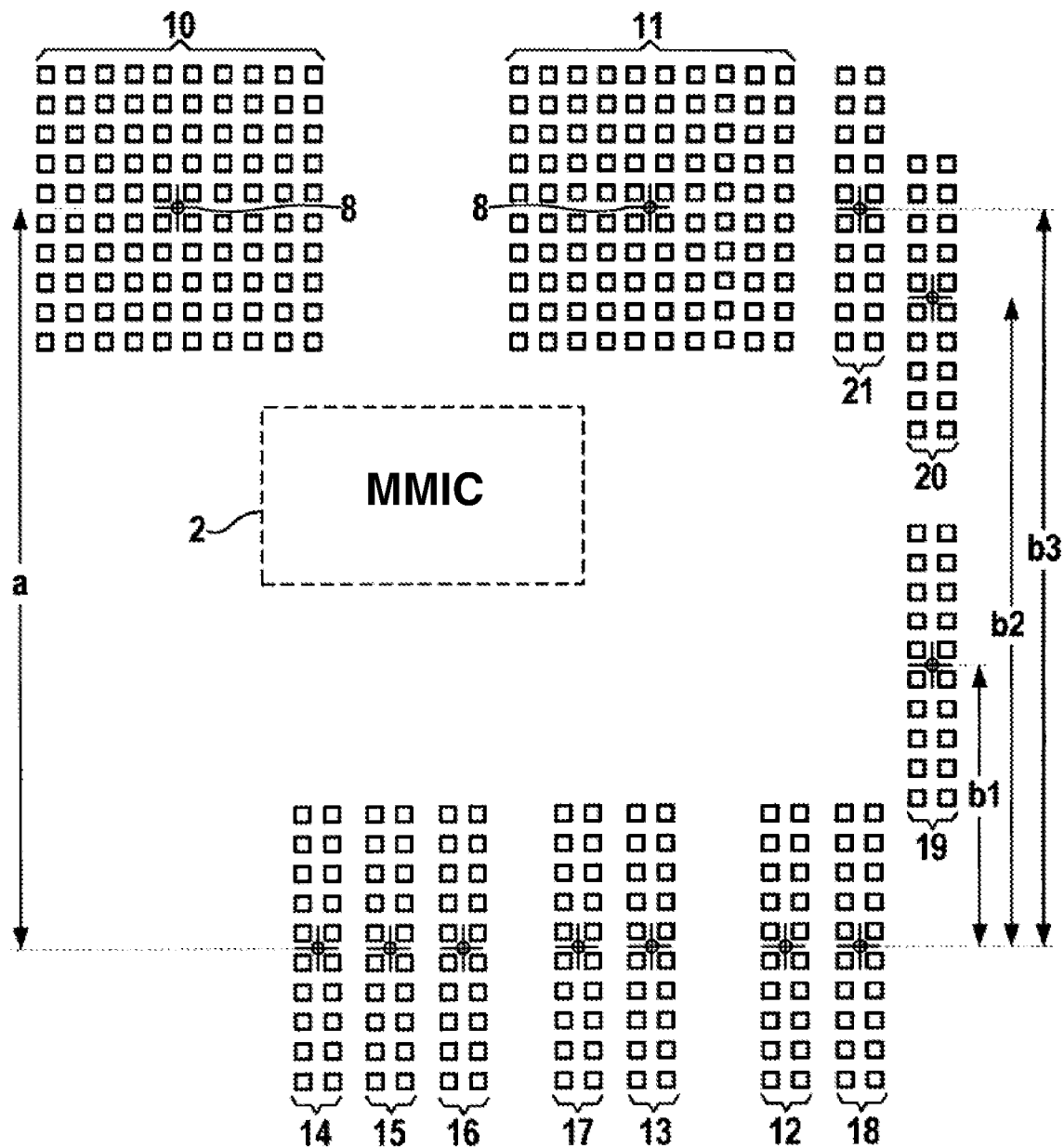
FIG. 3 illustrates an antenna array according to another example embodiment of the present invention.

A further exemplary embodiment of a radar system 1 according to the present invention is shown in FIG. 3. This figure also shows antenna arrays of patch antennas which are advantageously applied on the top side of a high-frequency circuit board. It is also conceivable that in the case of a particularly powerful radar sensor, two MMICs can be cascaded, thus making available a larger number of transmitting or receiving channels. It is conceivable, for example, that four transmitting antennas (Tx) 10 through 12 as well as eight receiving channels including receiving antennas (Rx) 14 through 21 are available. Here, it must be noted that the transmitting and/or receiving channels are phase-synchronous only within an MIMIC, but not necessarily between the two. It is thus advantageous to carry out a coherent processing using the channels of an MMIC. For example, the azimuth estimation can use the four receiving channels of the first MMIC, while the four receiving channels of the second MIMIC are used for the elevation angle estimation. For a sensor system of this type, the array of the patch antennas illustrated in FIG. 3 can be advantageously used. In this case, the elevation angle is estimated without the MIMO principle using four receiving antennas 18, 19, 20, 21 situated on the right-hand side, so that an unambiguous elevation angle estimation having a large aperture, i.e., having a high degree of accuracy and a high degree of separability, can be implemented. Since four measurements are used, it is possible to determine a quality value for a 1-target as well as for a 2-target elevation angle estimation in each case.

In this specific embodiment, the MIMO principle can additionally also be used in the elevation direction in order to ascertain the elevation angle of the object to be detected in an even improved manner.

For this purpose, two transmitting antennas (Tx) 10 and 11 are provided according to FIG. 3 which include a large number of patch antennas and patch lines in each case and which are situated horizontally next to one another in each case. Furthermore, two further transmitting antennas (Tx) 12, 13, which are also shifted only horizontally with regard to one another, are situated in the lower area of FIG. 3. However, the phase centers of the two transmitting antennas 10, 11 as well as of the two other transmitting antennas 12, 13 are shifted vertically in relation to one another, since these are shifted at distance a. This vertical distance of the transmitting antennas is then used in addition to the vertical offsets of receiving antennas 18, 19, 20, 21 for the elevation angle estimation.

Furthermore, receiving antennas (Rx) are provided, receiving antennas (Rx) 14, 15, 16, 17, 18 being in turn situated horizontally next to one another and additional receiving antennas (Rx) 19, 20, and 21 also being shifted vertically with regard to their phase centers in relation to receiving antennas (Rx) 14 through 18 which are shifted horizontally. For example, receiving antenna (Rx) 19 has a vertical offset b1 of the phase center; receiving antenna 20, which is also shifted only vertically in relation to vertically shifted receiving antenna 19, has an offset b2 in relation to antennas 14 through 18 which are situated horizontally next to one another; and a receiving antenna 21, which is illustrated by way of example, has a vertical offset of the phase center of b3 in relation to horizontally situated receiving antennas 12 through 18. In the center of the illustrated transmitting and receiving antennas 10 through 21, an area 2 is illustrated in which the MIMIC, or in the case of two cascaded MMICs, both MMICs, can be situated either on the back side or on the front side of the circuit board carrying the antenna array, since in this central area, the feed lines to the individual transmitting and receiving antennas are approximately equally long and thus a coherent emission of the transmitted signals and a coherent processing of the received signals is made possible, since the particular channels can be designed phase-synchronously to one another.

The characteristics of the transmitting and/or receiving antennas as well as of their exact positioning can be adapted to the particular application, the vertical offsets of the transmitting and receiving antennas being in particular also correspondingly configured. For example, a front sensor can be implemented to have a greater range and only one visual range by implementing a vertically offset transmitting antenna as the focusing antenna. In the case of applications of these sensors at the corners of a vehicle, for example for blind spot monitoring or adjacent lane monitoring functions, all transmitting antennas 10 through 13 and all receiving antennas 14 through 21 can be implemented having a wide emission characteristic.

What is claimed is:

1. A radar apparatus, comprising:
a radar system, including:
an antenna array for sending and receiving electromagnetic radiation;
N transmitting antennas; and
M receiving antennas;
wherein the radar system is configured to use the transmitting and receiving antennas to detect objects within a detection area of the transmitting and receiving antennas in a Multiple Input Multiple Output (MIMO) manner;
wherein the N transmitting antennas are configured to transmit signals, wherein each of the transmitted signals are orthogonal to one another during a transmission cycle;
wherein N-n of the N transmitting antennas are situated horizontally next to one another;
wherein n of the N transmitting antennas are situated at an identical horizontal offset from the N-n transmitting antennas;
wherein M-m of the M receiving antennas are situated horizontally next to one another; and
wherein m of the M receiving antennas are situated vertically offset from the M-m receiving antennas.

2. The radar system of claim 1, wherein n=1.

3. The radar system of claim 1, wherein m=1.

4. The radar system of claim 1, wherein the m receiving antennas each has a different vertical offset from the M-m receiving antennas.

5. The radar system of claim 1, wherein N=3.

6. The radar system of claim 1, wherein N=4.

7. The radar system of claim 1, wherein M is a multiple of 3.

8. The radar system of claim 1, wherein the transmitting antennas are patch antennas, the receiving antennas are patch antennas, or both the transmitting antennas and the receiving antennas are patch antennas.

9. The radar system of claim 1, wherein all M receiving antennas are patch antennas that includes a same number and array of patches.

10. The radar system of claim 9, wherein the transmitted signals, which are orthogonal to one another, are implemented using time division multiplexing, code division multiplexing, or frequency division multiplexing.

11. The radar system of claim 1, further comprising:
a monolithic microwave integrated circuit (MMIC) situated centrally between the N transmitting antennas and M receiving antennas.

12. The radar system of claim 11, wherein the monolithic microwave integrated circuit (MMIC) includes a signal processor for transmitting channels and receiving channels.

* * * * *